United States Patent [19]

Schulman

[11] 3,905,615

[45] Sept. 16, 1975

[54] INFLATABLE BODY AND HEAD RESTRAINT

[75] Inventor: Marvin Schulman, Broomall, Pa.

[73] Assignee: The United States of America as represented by the Secretary of the Navy, Washington, D.C.

[22] Filed: June 27, 1974

[21] Appl. No.: 483,603

[52] U.S. Cl.. 280/150 AB; 280/150 SB; 244/122 B; 297/389
[51] Int. Cl.² .......................................... B60R 21/10
[58] Field of Search ................... 244/122 R, 122 B; 280/150 AB, 150 SB; 297/385–390

[56] References Cited
UNITED STATES PATENTS

| | | | |
|---|---|---|---|
| 3,218,103 | 11/1965 | Boyce | 280/150 SB |
| 3,682,498 | 8/1972 | Rutzki | 280/150 AB |
| 3,722,951 | 3/1973 | Esquerra | 280/150 SB |
| 3,801,156 | 4/1974 | Granig | 297/386 |
| 3,827,716 | 8/1974 | Vaughn et al. | 280/150 AB |

FOREIGN PATENTS OR APPLICATIONS

| | | | |
|---|---|---|---|
| 1,431,248 | 1/1969 | Germany | 244/122 B |
| 2,013,341 | 9/1971 | Germany | 244/122 B |

Primary Examiner—Kenneth H. Betts
Attorney, Agent, or Firm—R. S. Sciascia; Henry Hansen; Robert J. Mooney

[57] ABSTRACT

A vehicle occupant restraint system which inflates upon impact. The restraint system includes lap and shoulder harnesses which resemble conventional restraint systems in their uninflated state. Upon impact the harnesses inflate as does an additional inflatable bladder which cushions the chest area and minimizes head rotation toward the chest.

11 Claims, 5 Drawing Figures

3,905,615

INFLATABLE BODY AND HEAD RESTRAINT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to restraint systems for vehicle occupants and in particular to restraint systems which automatically inflate upon impact or collision.

In aircraft crash situations, it is imperative that an aircraft pilot or crewman be adequately restrained so that he may best withstand the damaging effects of the forces generated by sudden acceleration and deceleration. Most aviators presently use restraint devices which basically comprise a lap belt and shoulder harness joined at a single point release for convenient ingress and egress. Although such restraint devices perform acceptably they do suffer from several drawbacks. If the lap and shoulder belts are worn loosely and not snugly, the crewman will move into the straps during a forward collision. As the crewman moves into the restraining straps under the impetus of his own acceleration, the straps are loaded to thousands of pounds. Since the straps are generally less than three inches wide, a relatively small portion of the crewman's anatomy reacts with the straps which condition can lead to bone fracture and tissue damage in severe crash situations. In addition to contributing to bone and tissue damage, loosely worn restraint straps allow submarining, i.e., the condition where the pelvic region of the body tends to slip under the lap belt. Submarining allows the crewman's body to contact other structures within the aircraft which in turn leads to injury from secondary impact. Lastly, presently used restraint systems are generally designed to limit torso motion only. During a forward collision, the upper torso is abruptly stopped in its forward motion as it loads the restraining straps. However, present restraining straps have no provision for restraining the crewman's head which rotates violently forward until the lower mandible strikes the chest. Although the exact mechanism causing injury is not completely understood, those skilled in the art generally agree that forward whiplash of the head contributes to vertebrae and other bodily damage, unconsciousness, or death due to the uncontrolled rotation and movement of the head.

SUMMARY OF THE INVENTION

Accordingly, it is an object of this invention to provide a restraint device which includes means for minimizing forward whiplash of the head. It is a further object of this invention to provide a restraint system which inflates upon a threshold impact to form a buffer for the vehicle occupant. It is a further object of this invention to provide an inflatable restraint system which is integrated with a strap restraining system in the uninflated or stowed condition and which is constructed for convenient ingress and egress. These and other objects of the invention are achieved as follows:

A restraint system which resembles a conventional single point release harness system is provided with integral, porous bladder structures formed from a loosely weaved synthetic material. In the uninflated state the bladders are folded accordion like and loosely stitched down to resemble conventional webbing. An integral gas generator is located centrally with respect to the harness in a terminus housing. Upon impact a sensor switch closes and supplies energy to fire the gas generator. The bladder structures which form the major portions of the lap and shoulder harness inflate virtually instantaneously as does an additional bag or material which unfurls across the chest to minimize head rotation into the chest.

Other objects, advantages and novel features of the invention will become apparent from the following detailed description of the invention when considered in conjunction with the accompanying drawings.

DESCRIPTION OF THE PREFERRED EMBODIMENT

Figure 1:
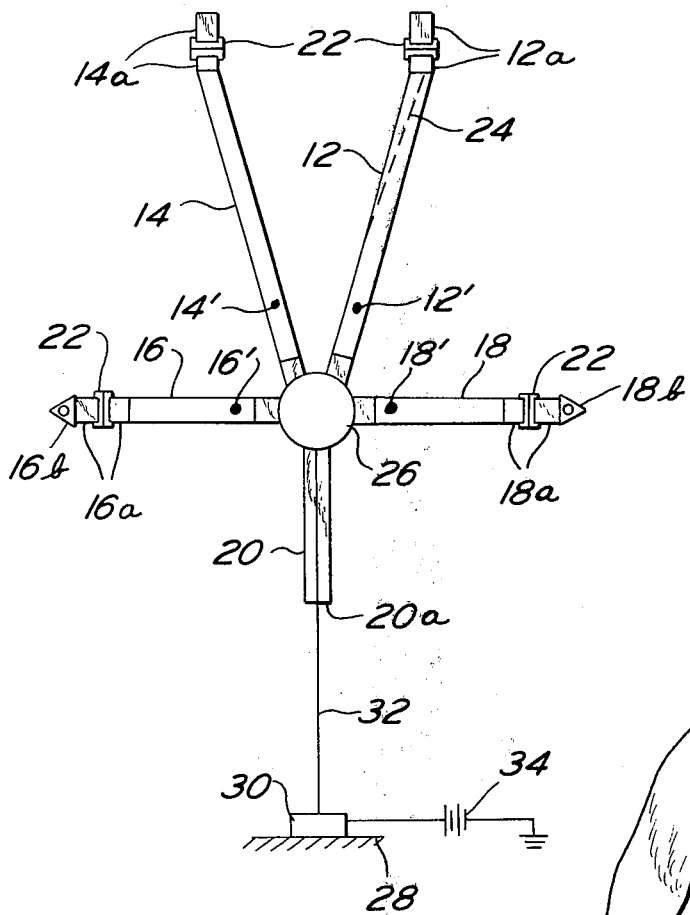
FIG. 1 shows a restraint system according to the invention in the uninflated state.
Figure 2:
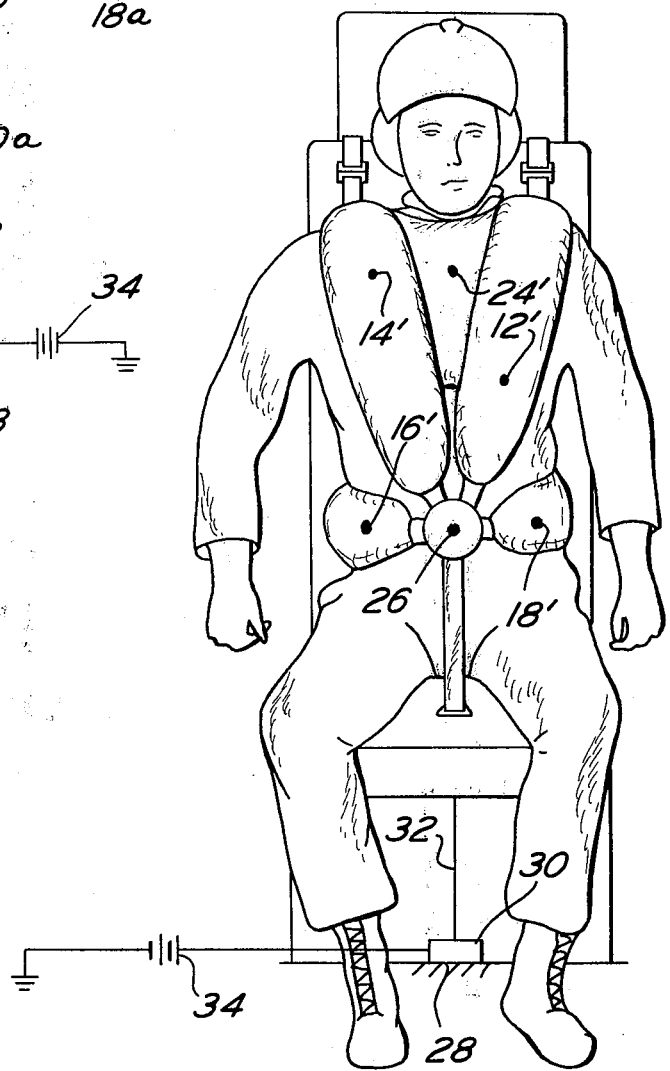
FIG. 2 shows the restraint system of FIG. 1 in an inflated state.

Referring to FIG. 1, the restraint system of the present invention resembles a conventional single point restraint system having shoulder belts 12, 14 and lap belts 16, 18 as well as a negative G strap 20. The distal ends 12a, 14a of the shoulder straps 12, 14 and the distal ends 16a, 18a of the lap belts 16, 18 and the entire negative G strap 20 are formed from conventional webbing material such as that set forth in MIL W-25361 or similar webbing specifications. The distal ends 12a, 14a of the shoulder straps 12, 14 terminate in conventional inertia reels (not shown) such as those described in MIL-R-8236. The distal ends 16a, 18a of the lap belts 16, 18 terminate into fittings 16b, 18b which mate with seat pan fittings (not shown). Both the shoulder straps 12, 14 and the lap belts 16, 18 are provided with double loop buckles 22 intermediate their respective distal ends. The buckles 22 permit adjustment of the restraint system to suit the individual wearer. The distal end 20a of the negative G strap 20 is arranged to be securely fastened by any suitable means to a seat as shown in FIG. 2.

The larger portions 12', 14' of the shoulder straps 12, 14 and the larger portions 16', 18' of the lap belts 16, 18 are made from a synthetic material such as nylon, dacron, polyester or similar materials. The portions 12', 14' 16' and 18' are each respectively fabricated in the form of a porous bladder structure which is folded accordian like and tacked in place with a light thread so that they have the appearance of conventional belts in the uninflated state as shown in FIG. 1. The relative porosity of the bladder structure can be regulated by choosing a suitable weave for the synthetic material such as a relatively loose weave known as 32 × 32 rip stop weave. The larger portions 12', 14' of the shoulder straps 12, 14 as well as the larger portions 16', 18' of the lap belts 16, 18 are secured to the webbing of their respective distal ends 12a, 14a, 16a, 18a by any suitable means such as sewing.

Folded into the left shoulder strap 12 is an additional porous bladder or bag 24 of the same synthetic material used for the straps 12, 14 and belts 16, 18. The bag 24 is located directly below shoulder level and extends downwardly approximately seven inches. The bag 24 is substantially wedge shaped and one side is permanently affixed to and has fluid communication with the large bladder portion 12' of the shoulder strap 12.

Figure 3:
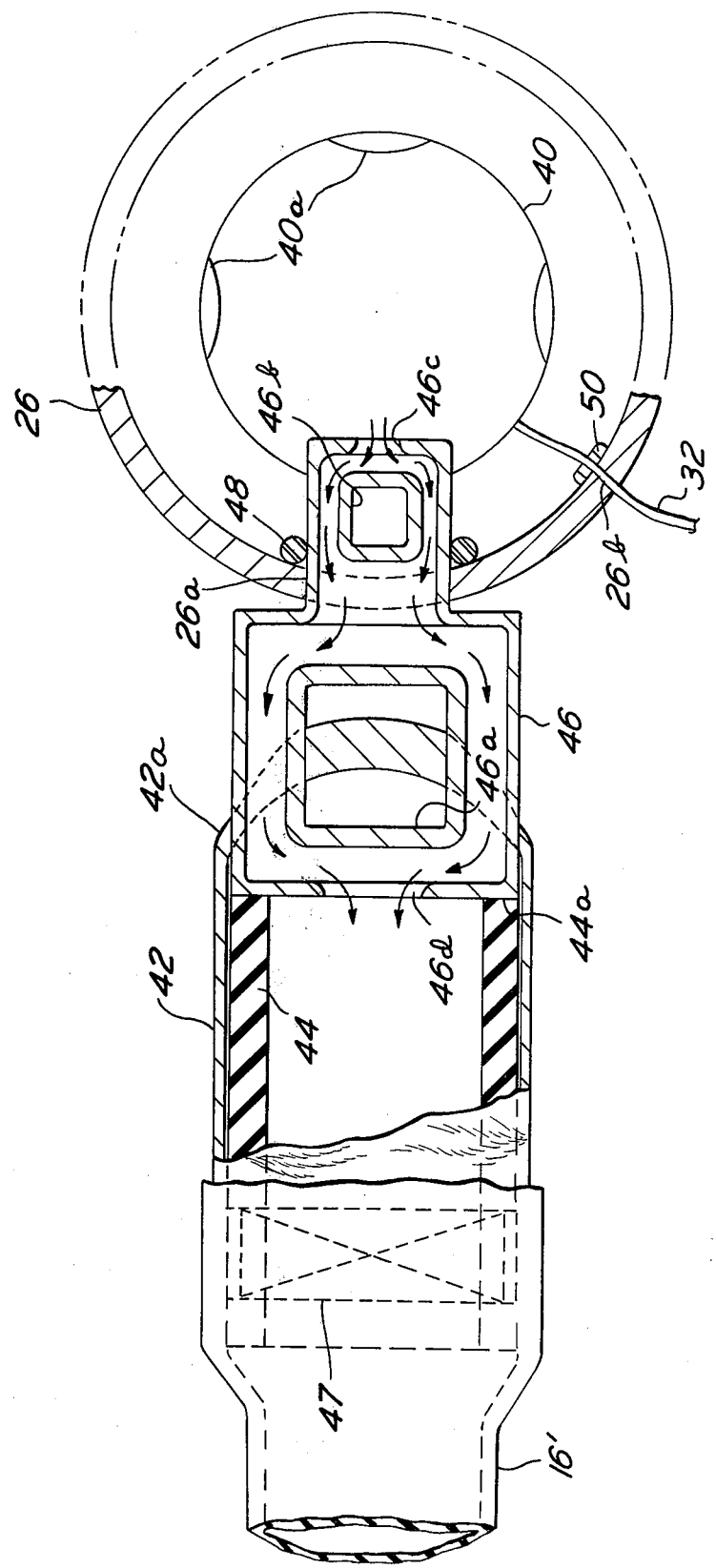
FIG. 3 shows a detailed view of a portion of the restraint system shown in FIG. 1.

The shoulder straps 12, 14 and the lap belts 16, 18 are all provided with fittings, as shown in FIG. 3, which terminate into a centrally located terminus housing 26. The terminus housing 26 is generally disc shaped and serves two functions. First, it serves as the means for attaching and disengaging the lap belts 16, 18 and shoulder straps 12, 14 around the wearer of the restraint system by means of conventional spring loaded cams. Second, the terminus housing 26, contains an automatically activated gas generator 40 which is used to inflate the bag 24 and the large bladder portions 12', 14', 16', 18' of the lap belts 16, 18 and shoulder straps 12, 14.

Mounted remotely from the restraint system on a portion of the airframe 28 is a conventional impact sensor switch 30. Electrical connection is made from the switch 30 to the gas container 40 via a protected wire 32.

Referring to FIG. 3, a detailed and partially sectioned view of the engagement of one of the lap belts 16 into the terminus housing 26 is shown. (The remaining lap belt 18 and the two shoulder straps 12, 14 are engaged with the terminus housing 26 in the same manner. The negative G strap 20 is secured to the outside of the terminus housing 26 by a loop or other suitable means.) The lap belt bladder structure 16' is securely sewn, at area 47, over a sleeve 42 of conventional webbing provided with an internal sealing rubber liner 44. The distal end 42a of sleeve 42 passes through a belt loop 46a of a retaining buckle 46. The distal end 44a of the rubber liner 44 abuts the buckle 46 in a fluid sealing manner. The retaining buckle 46 is metallic and is formed with passageways which permit gas flow through the buckle 46 from port 46c to port 46d as shown by the flow arrows in FIG. 3. To the right of the belt loop 46a is a cam loop 46b which accommodates a conventional, quick release, spring loaded cam (not shown). (As is well known, the cam is secured to the terminus housing 26 and cooperates with the cam loop 46b to secure the buckle 46 to the terminus housing 26.) Surrounding the cam loop end of the buckle 46 and securely attached to the terminus housing 26 is a conventional fluid seal 48. The seal 48 prevents gas leakage through the opening 26a in the terminus housing 26 which accommodates the cam loop end of the buckle 46.

Within the terminus housing 46 and securely affixed thereto is a conventional gas generator 40 such as a properly sized model 28300 cool-gas generator manufactured by Rocket Research Corporation. The protected wire 32 extends from the igniter assembly (not shown) of the gas generator 40 through an opening 26b in the terminus housing (sealed with a conventional fluid seal 50) and into the impact sensor switch 30.

The operation of the restraint system shown in FIGS. 1 and 2 is as follows. When the aircraft suffers at least a threshold impact during a collision, the impact sensor switch 30 closes and provides energy from the aircraft power source 34 to the igniter assembly of the gas generator 40 to thereby start production of gas flow through vents 40a into the bladders 12', 14', 16', 18' and bag 24. Enough gas pressure and flow is generated to fully inflate the bag 24 and the bladders 12', 14', 16', 18' as shown in FIG. 2 in less than 20 milliseconds with a peak pressure of approximately 4 to 6 psi. As the bladders 12', 14', 16', 18' are pressurized, the bag 24 unfurls from its stowed position (as shown in FIG. 1) and is driven across the chest as it inflates. As shown in FIG. 2, when the bag 24 is completely inflated, it is pressed up against the inside surface of the right inflated shoulder strap bladder 14' and forms a wedge 24' extending between both shoulder strap bladders 12', 14' which prevents chin contact with the chest and minimizes head rotation.

Since the bladders 12', 14', 16', 18' and the bag 24 have a high porosity, the gas will escape through the loosely weaved synthetic material at a relatively, fast rate. After approximately 150 milliseconds, the bag 24 and bladders 12', 14', 16', 18' will be totally deflated but the crewman will remain restrained by the deflated bladders.

Figure 4:
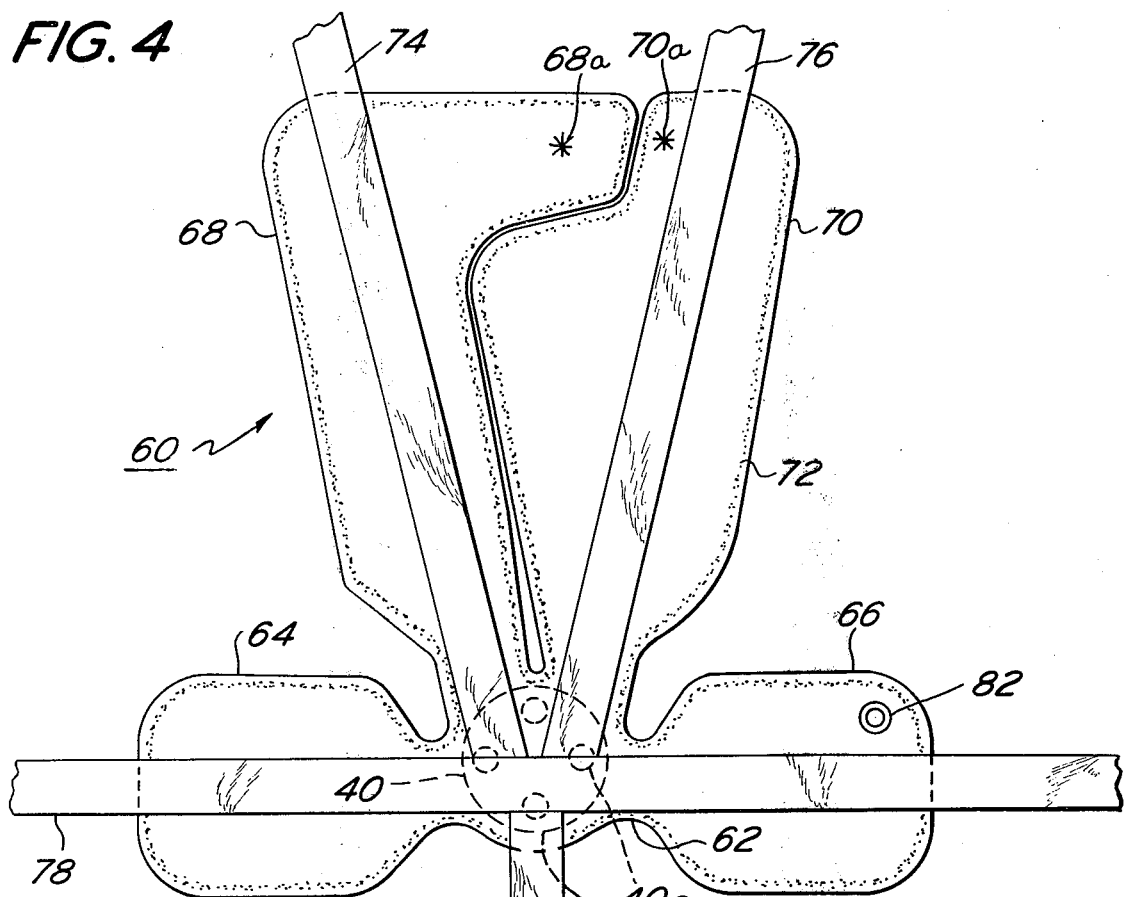
FIG. 4 is a modified form of the restraint system shown in FIG. 1.
Figure 5:
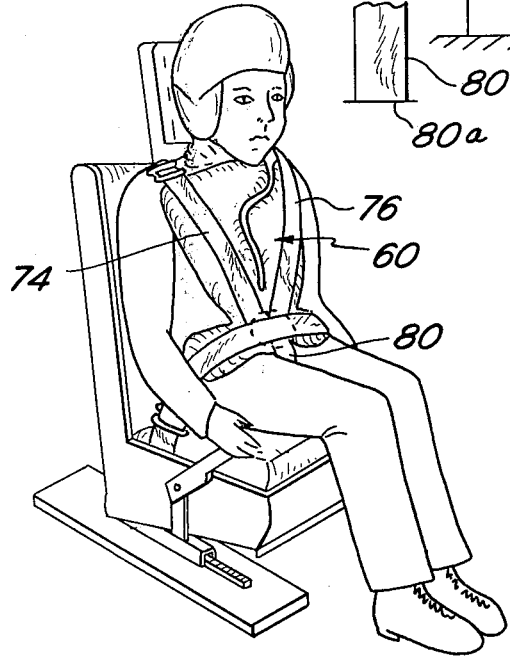
FIG. 5 shows the restraint system of FIG. 4 in an inflated state.

Referring to FIG. 4, a modified form of the restraint system is shown. Instead of using porous bladder structures, the restraint system shown in FIG. 4 achieves a cushioning effect by employing an inflatable impermeable bladder structure 60 overlaid with webbing. The bladder structure 60 is formed with a central pocket 62 which houses the gas generator 40. Extending from the central pocket 62 are left and right lap bladders 64, 66 as well as left and right chest bladders 68, 70. One of the chest bladders, e.g., the left chest bladder 68, is formed with an elongated tongue portion 68a, and the other chest bladder is formed with a mating curved portion 70a such that, in the inflated state, the tongue portion 68a abuts the mating portion 70a in lap joint fashion along the upper region of the wearer's chest. In the inflated state the tongue portion 68a serves as a guard which minimizes rotation of the head into the chest as is best seen in FIG. 5.

The bladder structure 60 is fabricated by forming two substantially identical patterns from an impermeable plastic such as nylon reinforced neoprene or the equivalent. The patterns take the general form shown in FIG. 4. After both patterns are cut, they are securely joined to each other along their entire perimeters so as to form the impermeable bladder structure 60; the patterns may be joined by any suitable means such as heat sealing or, preferably, by employing one inch V tape 72 cemented to the outer peripheral surfaces of the bladder structure 60. When forming the patterns for the bladder structure 60 it is preferred that the chest side of the tongue portion 68a be slightly shorter so that a curling force is imparted to the tongue portion 68a as the bladder structure 60 is inflated.

Overlaying the bladder structure 60 are left and right shoulder straps 74, 76 and a lap belt 78 as well as a negative G strap 80. The shoulder straps 74, 76 and the lap belt, 78 as well as the negative G strap 80 are each respectively formed from conventional, low elongation polyester webbing; the negative G strap 80, the straps 74, 76 and the lap belt 78 are each securely attached to the bladder structure 60 along their respective adjoining lengths by any suitable adhesive such as Permabond 101 cement. The straps 74, 76 and the lap belt 78 may be releasably attached to the seat pan (not shown) by conventional buckles and fittings (not shown). The distal end 80a of the negative G strap 80 is securely affixed to the seat pan or aircraft frame by any suitable means. In the embodiment shown in FIG. 4, the straps 74, 76 and the belt 78 are employed to maintain the bladder structure in the correct position with respect to the wearer's body and are principally relied upon to exert a significant restraining force on the wearer's body.

As in the embodiment shown in FIGS. 1 and 2, the protected wire 32 extends from the igniter assembly (not shown) of the gas generator 40 through a fluid sealed opening (not shown) in the pocket 62 and thence to the impact sensor 30.

The operation of the device shown in FIG. 4 is as follows. In the uninflated state, the lap bladders 64, 66 and the chest bladders 68, 70 are folded under the lap belt 78 and shoulder straps 74, 76 respectively, and lightly taped in place so as to present a neat appearance. When the aircraft suffers at least a threshold impact during a collision, the impact sensor switch 30 closes and provides energy from the aircraft power source 34 to the igniter assembly (not shown) of the gas generator 40 to thereby start production of gas flow into the lap bladders 64, 66 and chest bladders 68, 70. Enough gas pressure is generated by the canister 40, and enough gas flow through the vents 40a occurs, to burst the retaining tapes and to fully inflate the bladder structure 60 is less than 20 milliseconds with a peak pressure of approximately 6 psi. As the bladder structure 60 is pressurized, the lap bladders 64, 66 and chest bladders 68, 70 unfold from underneath the respective shoulder straps 74, 76 and lap belt 78 and the tongue portion 68a is driven across the chest to mate with the curved portion 70a. As shown in FIG. 5, when the bladder structure 60 is completely inflated it forms a cushion for the wearer of the restraint system and the tongue portion 68a minimizes head rotation into the chest so that the deleterious effects of head rotation into the chest set forth hereinabove are reduced or eliminated.

The bladder structure may be deflated by means of a conventional exhaust valve 82 or alternatively, a rupture disc formed as an integral part of the bladder.

Obviously many modifications and variations of the present invention are possible in the light of the above teachings. It is therefore to be understood that within the scope of the appended claims the invention may be practiced otherwise than as specifically described.

I claim:
1. A vehicle occupant restraint system comprising:
a central housing;
first and second shoulder strap members extending from said central housing, each said shoulder strap member having an inflatable bladder portion;
first and second lap belt members extending from said central housing, each said lap belt member having an inflatable bladder portion;
an inflatable chin guard member operatively attached to and in fluid communication with the inflatable bladder portion of one of said shoulder strap members;
gas generator means positioned within said central housing for producing pressurized gas to inflate each said inflatable bladder portion and said inflatable chin guard member upon reception of a command signal; and
impact sensor means attached to a vehicle in which said occupant is riding and operatively connected to said gas generator means for generating said command signal when said vehicle suffers a threshold impact.

2. A vehicle occupant restraint system comprising:
a central housing;
at least one shoulder strap member extending from said housing and having a normally uninflated bladder portion;
at least one lap belt member extending from said housing and having a normally uninflated bladder portion;
gas generator means positioned within said central housing for producing pressurized gas upon reception of a command signal;
conduit means for providing fluid communication between said gas generator means and each of said bladder portions; and
a normally uninflated chin bag member operatively connected to and in fluid communication with the bladder portion of said shoulder strap member.

3. A vehicle occupant restraint system according to claim 2 further including:
impact sensor means attached to a vehicle in which said occupant is riding and operatively connected to said gas generator means for generating said command signal when said vehicle suffers a threshold impact.

4. A vehicle occupant restraint system according to claim 2 wherein:
the bladder portion of said shoulder strap member and the bladder portion of said lap belt member are folded accordian like in the uninflated state; and
said chin bag member is substantially wedge shaped and folded under the bladder portion of said shoulder strap member with which said chin bag member has fluid communication when said chin bag member is in the uninflated state.

5. A vehicle occupant restraint system according to claim 4 wherein:
the bladder portion of said shoulder strap member, the bladder portion of said lap belt member and the chin bag member each have a predetermined porosity;
whereby each of said bladder portions inflates and unfolds and said chin bag member inflates and unfurls across the chest area under the occupant's chin within a predetermined time after said gas generator means produces said pressurized gas, each of said bladder portions and said chin bag member thereafter deflating.

6. A vehicle occupant restraint system comprising:
an inflatable bladder member having a central pocket portion, first and second pelvic portions extending outward from said central pocket portion and first and second chest portions extending outward from said central pocket portion;
gas generator means positioned within said central pocket portion for producing pressurized gas upon reception of a command signal;
said first chest portion being wider at its distal end than at its proximal end so as to form a tongue-like projection at said distal end; and
said second chest portion being narrower at its distal end than at its proximal end so as to form an abutting surface for said tongue-like projection.

7. A vehicle occupant restraint system according to claim 6 further including:

a lap belt member fixedly secured to one surface of each said pelvic portions;

a shoulder strap member fixedly secured to one surface of each said chest portions.

8. A vehicle occupant restraint system according to claim 7 further including:

impact sensor means attached to a vehicle in which said occupant is riding and operatively connected to said gas generator means for generating said command signal when said vehicle suffers a threshold impact.

9. A vehicle occupant restraint system according to claim 8 wherein said inflatable bladder member is formed from a fluid impermeable synthetic material.

10. A vehicle occupant restraint system according to claim 9 further including:

deflation means integral with said bladder member for deflating said bladder member.

11. A vehicle occupant restraint system according to claim 6 wherein:

one surface of said tongue-like projection is shorter than the other surface so as to impart an uncurling force to said projection upon inflation.

* * * * *